Jan. 30, 1968 V. R. DE STEFANO 3,366,778

PULSE REGISTER CIRCUIT

Filed Nov. 16, 1964 6 Sheets-Sheet 1

INVENTOR
V. R. DE STEFANO
BY Donald M Duft
ATTORNEY

FIG. 3
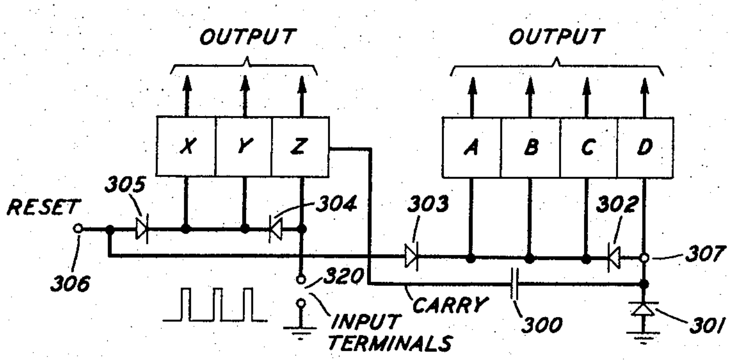
FIG. 4
| | A | B | C | D |
|---|---|---|---|---|
| X | 1 | 4 | 7 | 0 |
| Y | 2 | 5 | 8 | |
| Z | 3 | 6 | 9 | R |
FIG. 5
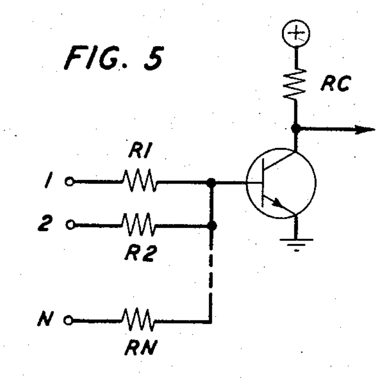
FIG. 6
INVERTING OR GATE
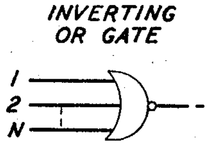
FIG. 7
INVERTING AND GATE
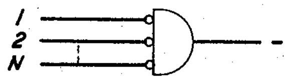

United States Patent Office 3,366,778
Patented Jan. 30, 1968

3,366,778

PULSE REGISTER CIRCUIT

Vincent R. De Stefano, Lincroft, N.J., assignor to Bell Telephone Laboratories, Incorporated, New York, N.Y., a corporation of New York Filed Nov. 16, 1964, Ser. No. 411,195
21 Claims. (Cl. 235—92)

This invention relates to a pulse register and, more particularly, to a plural order pulse register which utilizes transistor-resistor logic gates as active circuit elements.

The major functions of any pulse register are: (1) to recognize its seizure by a circuit requiring register service and, in response thereto, to prepare itself for the reception of digit-representing pulse trains, (2) to count and store the successively received digits, (3) to read out the stored digits upon request.

The prior art discloses many relay and vacuum tube type registers which perform the aforementioned functions. The physical characteristics of a register, including the type of circuitry utilized by it, are usually not of controlling importance if the register is used as a general purpose device for the counting of pulses from various sources, at varying times, and under varying conditions. Such is the case for a laboratory type pulse-counting register. In such instances, the electrical specifications of the register, including its pulse-counting capabilities, are usually far more important than its physical characteristics. However, when a register is to be used as an integral part of a system, such as for example, a telephone system, the system requirements usually govern not only the electrical, but also the physical specifications such as the size, weight, heat dissipation, current consumption, etc., of each and every circuit comprising the system.

The currently available electronic solid state switching systems provide an impressive reduction in size and power consumption compared with the relay and other type systems heretofore available. It is desirable that the pulse registers used in these systems also be of the solid state type in order that their physical characteristics may be compatible with the remainder of the system.

It is an object of the invention to provide a register that is suitable for use in solid state electronic switching systems.

It is a further object of the invention to provide a plural order pulse register that utilizes solid state circuits.

In accordance with the present invention, an electronic solid state plural order pulse register is provided which uses transistor-resistor logic gates as active circuit elements. The size, power consumption, and heat dissipation of the circuit elements used is such that the resultant register is fully compatible for use in present-day electronic switching systems. The register basically comprises a plural order counter for counting and storing successively received digits, a steering circuit for controlling the overall operation of the register as well as for ensuring that each received digit is stored in the proper counting order, an input circuit for applying the received input pulses to the counters, and a readout circuit for providing an output indication of the registered digits.

The disclosed exemplary embodiment of the invention has two counter orders—a tens and a units. Each order comprises a chain of transistor-resistor logic (TRL) gates interconnected so as to count and store each received digit in combinational code form. Because of the combination code used, the TRL gates of each counter order are operated in such a manner that two gates are always OFF while the others are ON. A TRL gate is, for the purposes of this specification, said to be OFF when its transistor is cut OFF to the point where no collector current flows. This condition is obtained by removing the base drive, i.e., grounding the base, so that no base current and, in turn, no collector current flows through the transistor. A TRL gate is said to be ON when its transistor is conducting to the point of saturation. This condition is obtained by applying a positive potential to the base so that sufficient base current and, in turn, sufficient collector current flows to saturate the transistor. Thus, the collector of a grounded emitter TRL gate in an ON condition is at a ground potential, while the collector of the same gate in an OFF condition is at the potential of the battery supply.

Each counter has a combination of OFF gates that is unique to each digit that may be counted and registered by it. The counter advances one step, from position to position, for each pulse received. This, in turn, changes the combination of OFF counter gates once for each received pulse. The operative condition of each counter may be determined at any time by ascertaining which two of its TRL gates are in an OFF condition.

The readout circuit comprises a plurality of TRL gates operated as inverting AND gates, with each AND gate being individual to a different TRL counter gate. Each readout AND gate has two inputs, one of which is connected to the output of its associated counter gate while the other is connected to a clamping lead which, in turn, is connected to the steering circuit. This puts the conductive condition of each readout AND gate transistor under the joint control of its associated TRL counter gate and the steering circuit. The steering circuit applies a ground potential to the clamping lead whenever it is desired to read out the counter and, at all other times, applies a battery potential thereto. Recalling that a counter TRL gate in an ON condition applies a LOW potential to the input of its associated readout gate, while a counter gate in an OFF condition applies a HIGH potential, it may be seen that with a ground on the clamping lead to signify a readout command, each readout AND gate transistor associated with a counter stage in an OFF condition will be rendered conductive while each readout AND gate associated with a counter gate in an ON condition will be rendered nonconductive, i.e., cut OFF, since both of its inputs will be grounded. The output of each readout gate is the inverse of the potential on the collector of its associated counter stage, and therefore the output of the readout gates associated with OFF counter gates will be LOW, while the output of the readout gates associated with ON counter gates will be HIGH.

The output of the readout gates is applied to a utilization circuit which determines the value of the registered digits from the potentials received from the readout gates. The steering circuit applies a positive potential to the clamping lead of each readout AND gate to terminate a readout operation. This turns ON the transistor of each readout gate irrespective of the current conductive or nonconductive condition of its associated counter gate.

A pulse steering TRL AND gate is connected to the input of each counter order to either connect or disconnect, under control of the steering circuit, the input of each counter order from the pulses that are to be counted. One input of each of these AND gates is connected to the steering circuit, while the other input is connected to the signal conductor which receives the pulses to be counted. The output of each AND gate is connected to the input of its associated counter order. With this arrangement, all pulses are applied to both pulse steering AND gates. However, the steering circuit enables only one gate at a time so that the pulses representing each digit may pass through only the enabled AND gate to be counted and registered in the proper counter order.

The steering circuit also comprises a plurality of interconnected TRL gates and has four sections, or states: a reset, a tens, a units, and a readout section. The four sections are interconnected with each other, as well as with the remainder of the circuitry of the register, in such a manner that the steering circuit advances from its reset to its tens state in response to a register seizure; from its tens state to its units state following the reception of the tens digit; and finally from its units state to its readout state following the reception of the units digit. The output of the TRL gate for each section is connected to the various portions of the register so as to control the sequence of circuit actions associated with each state of the steering circuit.

The input circuit of the register receives the pulses that are to be counted and also recognizes an initial register seizure in order that it may prepare the register for the reception of pulses. As part of this function, the input circuit transmits a signal to the steering circuit at this time to advance it from its reset to its tens state. When in the tens state, the steering circuit applies the necessary control potential to enable the pulse steering AND gate for the tens counter so that the first received train of pulses may be transmitted therethrough to the input of the tens counter. During this time, the steering circuit also applies a control potential to disable the pulse steering AND gate for the units counter, thereby isolating the units counter from the pulses of the tens digit. When the input circuit receives the pulses for the tens digit, it regenerates them into pulses of the polarity and magnitude required by the pulse counters and applies them to the pulse steering AND gates for both the tens and units counters. Only the gate for the tens order is enabled at this time, and therefore the pulses of the tens digit pass through this gate only to the input of the tens counter, which now counts and registers the tens digit in combinational code form.

The steering circuit is stepped from its tens to its units position once the tens digit has been received and counted. In its units position, the steering circuit disables the pulse steering gate for the tens counter and enables the corresponding AND gate for the units counter so that it may apply the pulses of the units digit to the input of the units counter. When the input circuit receives the pulses for the units digit, it regenerates them and applies the regenerated pulses to the tens and units pulse steering gates. The pulses pass through the enabled units gate to the input of the units counter which counts and registers the units digit in combinational code form. The tens counter is isolated from these pulses by the disabled tens order pulse steering gate.

The steering circuit advances from its units to its readout state following the reception of the second digit. In this state, the steering circuit disables both pulse steering gates so that the counters will not respond to any further impulses that might be inadvertently received. The steering circuit at this time also transmits a readout signal, via the clamping lead, to the readout AND gates thereby enabling them so that their combined outputs comprise an indication of the digit stored in each counter.

It is expected that two digits will be received on most register usages. However, in certain systems in which the register may be used it is desirable to have the register perform its customary plural order counting operation for tens digits having certain predetermined values and for aborting its normal operation and for passing from a tens to a readout condition immediately upon the detection of the reception of tens digits having different predetermined values. This feature is useful when the register is to be used as part of a telephone system in which a first dialed digit of 0 indicates that no further digits are to be received and that the call is to be routed to an operator. Similarly, a first received digit of 9 indicates that a call requires special handling in many systems. Accordingly, the register circuit of the present invention has facilities within it for detecting the registration of a tens digit of either a 0 or a 9 and, in response thereto, for causing the register to bypass the units order and for advancing immediately to a readout condition.

When the register is utilized in a telephone system, it normally comprises a portion of the common control circuitry and as such only a limited number of registers are provided to serve many calls. It is then desirable that the per call holding time of the register be minimized in order to minimize the number of registers required. This, in turn, necessitates that the register release quickly in the event that the calling party should hang up or in the event that he should seize the register and then fail to dial within a predetermined period of time. Accordingly, the present register includes timing control circuitry for releasing the register within a predetermined period of time after a request for its services has been terminated. It also contains circuitry for releasing the register if no input pulses are received within a predetermined period of time after its seizure.

A feature of the invention is the provision of a plural order electronic pulse register having an input circuit for applying all received pulses to all orders together with a steering circuit for controllably enabling successively received pulse trains to be entered into successive orders of the register.

A further feature of the invention is the provision in a plural order electronic pulse register of a readout circuit controlled by a steering circuit following the reception of a predetermined number of pulse trains for supplying an output signifying the digit registered in each order.

A further feature of the invention is the provision in a plural order register having a readout circuit which comprises plural input gates each of which has one input connected to an individual output of the register and a second input connected to a steering circuit which, after the reception of a predetermined number of pulse trains by the register, applies an enabling potential to one input of each gate, thereby providing at the output of the gates an indication of the quantity registered in each register order.

A further feature of the invention is the provision of a counter comprising a plurality of bistable gates, with the counter having *n* gates in an OFF condition and its remaining gates in an ON condition, and with the counter being effective upon the receipt of pulses at its input for advancing the combination of OFF gates one counter position for each received input pulse.

A further feature of the invention is the provision in the foregoing register of a steering circuit, a pulse steering gate for each register order, a first input for each gate connected to said steering circuit and a second input for each gate connected to a pulse source, whereby the steering circuit controllably applies enabling potentials to the first input of successive pulse steering gates in order to enable successively received pulse trains to be counted by successive orders of the register.

A further feature of the invention is the provision in a plural order register of a coincidence detector having its inputs connected to selected ones of the plurality of bistable gates comprising the counter for the first register order so that the detector may detect the registration of a predetermined digit and, in response thereto, abort counting operations by subsequent register orders and immediately advance the register steering circuit to a readout position in which it controls the readout of the digit registered in the first order.

A further feature of the invention is the provision in the disclosed register of a bistable steering control gate which is switched from a normally ON to an OFF condition upon a seizure of the register to advance the register steering circuit from a reset to a tens position, which is maintained in an OFF condition for the duration a first received pulse train, which is then switched to an ON condition to advance the steering circuit from a tens to a units position, which is switched to and held in an OFF position for the duration a second pulse train is received, and which is switched back to an ON condition to advance the steering circuit to a readout position to enable the digit registered in each register order to be transmitted to a utilization circuit.

A further feature of the invention is the provision of a counter having a chain of TRL gates, an input terminal connected to the base of each gate and interconnections between the base of each gate and the collector of all other gates whereby the operative condition of the counter is such that one of its gates is OFF while the remaining gates are ON and whereby the counter is effective to advance the OFF gate one position for each pulse received by the input terminal.

A further feature of the invention is the provision of two TRL gate counters of the foregoing described type, with the input terminal of one counter being connected to the collector of the other counter so as to provide a plural stage counter in which digits are registered in combinational code form with each digit being represented by a unique combination of OFF gates.

These and other objects and features of the invention will become more apparent upon a reading of the following description thereof taken in conjunction with the drawings in which:

FIG. 1 illustrates the details of the basic circuit that is used as a pulse counter in the present invention;

FIG. 2 comprises a diagrammatic symbolization of the counter of FIG. 1;

FIG. 3 illustrates the manner in which the counter of FIGS. 1 and 2 may be interconnected to form a two-stage counter operable in combinational code form;

FIG. 4 illustrates the code in accordance with which the counter of FIG. 3 operates;

FIG. 5 illustrates the details of the basic transistor-resistor logic inverter circuit that is used extensively in the present invention as both an AND gate and an OR gate;

FIG. 6 illustrates the symbol used when the circuit of FIG. 5 is used as an inverting OR gate;

FIG. 7 illustrates the symbol that is used when the circuit of FIG. 5 is used as an inverting AND gate.

*Pulse counters—FIGS. 1, 2, 3, and 4*

Figure 1:
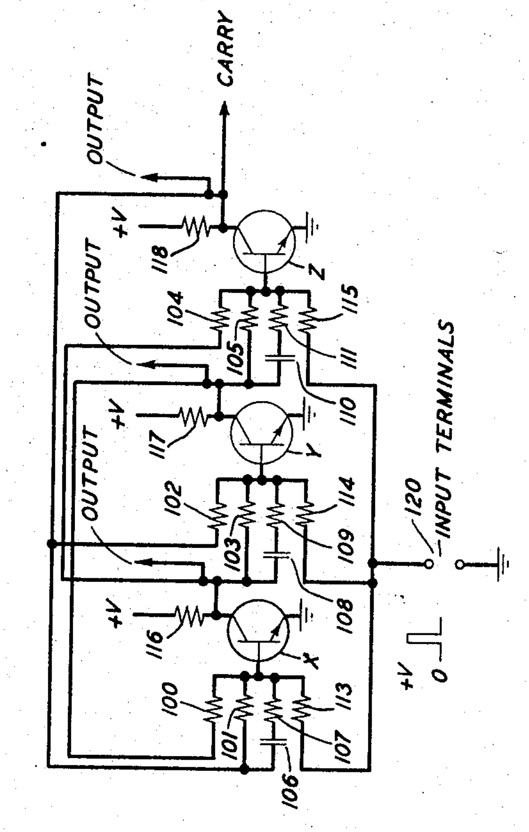

FIG. 1 discloses the details of the circuit that is used as the basic building block of the counting and steering circuits. The drawing disclosing the details of the register has been simplified by disclosing the counters and steering circuits in diagrammatic form, and therefore this discussion is presented in order that their circuit details and operation may be fully understood. The circuit of FIG. 1 has three positions, X, Y, and Z, each of which has a transistor, a capacitor, and five resistors. Each position is directly coupled to every other position via the resistors 100 through 105. Each position is also coupled to the next succeeding position by an RC combination, such as elements 106 and 107 for stage X. The input pulses are applied to the circuit by means of input terminal 120 and are, in turn, transmitted to the bases of the three transistors by means of resistors 113, 114, and 115.

There is only one possible mode of operation for this circuit, i.e., one transistor is OFF while all of the remaining transistors are ON. The OFF transistor holds the other transistors ON, and vice versa. The circuit is stable in any one of its three positions. The circuit is considered, for the purposes of this specification, to be in the position currently having the OFF transistor. Thus, for example, if transistor X is OFF while transistors Y and Z are ON, the circuit may be said to be in position X. The output of each position is taken directly from the collector of its associated transistor. A potential of approximately +V is applied to the output of each position whose transistor is in an OFF condition, while a potential approximating that of ground is applied to the output of the position whose transistor is currently ON.

A change of state for the circuit of FIG. 1 occurs as follows: A positive-going input pulse on terminal 120 turns ON the transistor that currently is OFF. When the input pulse returns to its normal or 0 volts condition, the succeeding transistor turns OFF. The proper sequence is assured because the capacitor in the interconnecting network has stored a charge built up by the preceding transistor turning ON. This serves to inhibit the base current in the succeeding transistor long enough to turn it OFF when the input pulse returns to normal. For example, assume that transistor X is OFF and that transistors Y and Z are ON. In this condition, the left-hand plate of capacitor 108 interconnecting transistors X and Y is positive while the right-hand plate of the same capacitor is at ground potential and is therefore negative with respect to its left-hand plate. A positive-going pulse is then applied to terminal 120 and it drives all three transistors ON for the pulse duration. The pulse duration is short, capacitor 108 does not have to time to discharge, and it remains charged at essentially its original potential. When the input pulse terminates, one transistor must turn OFF because this is the only stable state of the circuit. Transistor Y turns OFF at this time since the turn-on of transistor X lowers the left-hand plate of capacitor 108 to approximately ground potential. The right-hand plate of the same capacitor is negative with respect to the left-hand plate, and therefore it holds the base of transistor Y negative for the capacitor discharge time. The remaining transistors, X and Z, stay ON when the pulse ends, due to their direct coupling to the collector of the transistor Y which is now at a +V potential. The ON condition of transistors X and Z lowers the potential on their collectors to ground. The direct resistive coupling between the collectors of these transistors and the base of transistor Y, in turn, grounds the base of transistor Y thereby holding it OFF.

The OFF transistor is propagated along the chain one position for each positive-going input impulse received. A carry pulse may be obtained from the collector of any transistor, such as transistor Z as shown, and applied to the corresponding input terminal of another counter chain to provide a plural stage counter.

Figure 2:
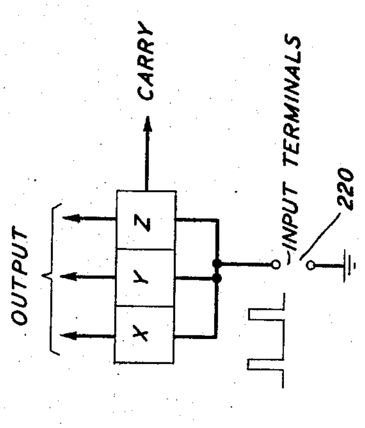

The counter shown on FIGS. 1 and 2 may be expanded to have as many counter stages as may be desired. The principles of operation of the expanded counter will be the same as just described for the three-stage counter in the preceding paragraph, namely, the transistor of one stage will be in an OFF condition while the transistor in each of the remaining stages will be in an ON condition. The expanded counter will also respond to the reception of input pulses in a similar manner so that the counter stage having the OFF transistor will be propagated down the chain one position for each received pulse.

FIG. 2 discloses a diagrammatic representation of the counter circuit of FIG. 1.

FIG. 3 discloses a plural stage counter having positions X, Y, and Z in a first stage and positions A, B, C, D for a second stage, with the carry signal between stages being provided from the output of the Z position of the first stage. A differentiator comprising capacitor 300 is in the carry circuit in order to differentiate the steady-state D-C signals on the Z output of the first stage. Diode 301 is provided to absorb the negative-going differentiated pulses.

The stepping pulses for the two-stage counter are applied to the input terminal 320 and, in response thereto, the XYZ counter advances one position per pulse and applies a positive carry signal to the ABCD stage each time the Z position goes from an ON to an OFF condition. The carry signal is differentiated and applied as a positive pulse to the 307 input terminal of the ABCD counter section which advances its operative position one step for each carry pulse received.

The XYZ and ABCD counter stages, when interconnected as shown on FIG. 3, together comprise a counter having a reset position and ten counting positions for counting the digits 0 through 9 in combinational code form. The combinational code used in the present invention is shown on FIG. 4, and it may be seen from a study of this figure that each position of the counter is represented by a unique combination of two-counter sections in an OFF condition. Thus, for example, the OFF condition of counter sections X and D represent the digit 0, the OFF condition of counter sections Z and A represent the digit 3, while the OFF condition of sections Z and D represent the R (reset) position.

A positive-going reset pulse applied to terminal 306 resets both counter stages to their reset (R) position in accordance with the code of FIG. 4. The reset pulse is applied to sections X, Y, and ABC, through diodes 305 and 303, respectively, and is isolated from the Z and D sections by diodes 304 and 302, respectively. At this time, the XY and ABC sections are conducting while the Z and D sections are OFF.

*Logic circuits—FIGS. 5, 6, and 7*

The register makes extensive use of transistor-resistor logic circuits in which a single transistor stage is used as an inverter, an inverting AND gate, or an inverting OR gate, depending upon the nature of the input signals applied thereto and the function to be performed by the stage. FIG. 5 discloses details of such a circuit which comprises a single transistor, a collector-resistor RC and a plurality of base input resistors, R1 . . . RN, of which there is one for each input to the stage. The circuit of FIG. 5 is basically a single-stage inverter since a positive-going signal applied to the base appears as a negative-going signal at the collector, and vice versa.

The stage may be used as an inverting OR gate by leaving the circuit normally cut OFF, i.e., all inputs at a ground potential. In this case, a positive-going signal applied to one or more input leads will turn the transistor ON and provide a negative-going signal on the collector. The stage also may be used as an inverting AND gate, in which case the transistor is normally held ON by a positive signal applied to one or more of its input leads. The AND condition of the circuit is achieved by a LOW potential on all input leads simultaneously, at which time the transistor turns OFF and produces a positive-going signal at its output.

The circuit of FIG. 5 is often used in the circuit of the present invention as an AND gate in such a manner that one of its inputs may be considered as a signal input while the remaining ones of its inputs may be considered as clamping inputs which are effective to either enable or disable the AND gate and thereby determine whether the signal on the signal input is to pass through the gate to its output. When it is desired to disable or block the gate in order to prevent any input signals from passing through to the output, one or more of the clamping inputs are elevated to a positive potential to saturate to the transistor and thereby prevent the potential of the signal input conductor from exerting any influence on the conductive condition of the transistor. Conversely, all of the clamping input conductors are grounded when it is desired to enable or turn ON the gate in order to let signals on the input signal conductor pass therethrough. This, in turn, places the conductive condition of the transistor solely under control of its signal input conductor and, as a result, the signals appearing on this conductor can then pass through the gate and appear at its output in inverted form.

FIG. 6 discloses the symbol utilized when the circuit of FIG. 5 is used as an inverting OR gate, while FIG. 7 discloses the symbol utilized when the circuit of FIG. 5 is used as an inverting AND gate.

*Register circuit FIGS. 8, 9, 10, and 11*

Figure 12:
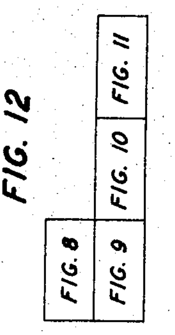
Figure 8:
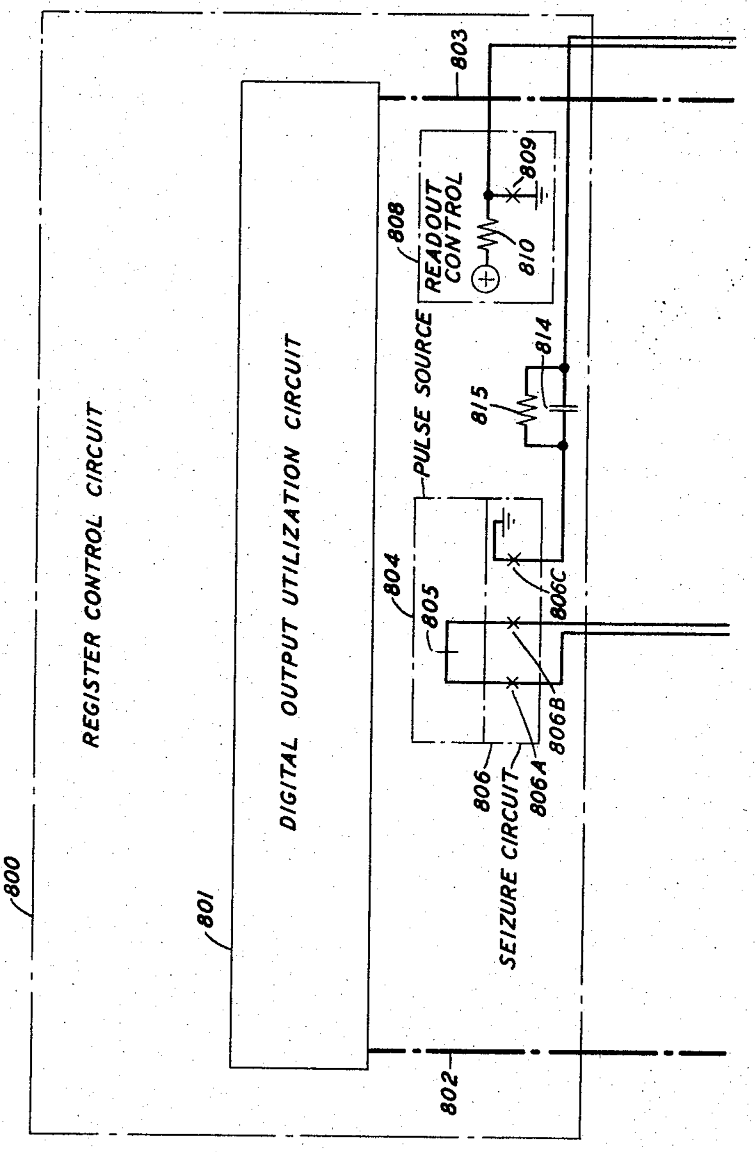
FIGS. 8, 9, 10, and 11, when arranged as shown in FIG. 12, illustrate the circuit details of a register in accordance with an illustrative embodiment of the present invention.

The circuit details of the over-all register are shown on FIGS. 8, 9, 10, and 11, when arranged with respect to each other as shown on FIG. 12. The register may be functionally subdivided into the plural order counter and storage circuits shown on FIG. 9, the steering and pulse train detector circuit shown on FIG. 10, the time-out, the supervision, and the pulse regenerator circuits shown on FIG. 11, together with the register control circuit of FIG. 8. The register control circuit, in turn, comprises the seizure circuit 806 which controls the seizure of the register, the pulse source 804 which transmits to the register the pulses to be counted, the readout control circuit 808 which initiates and controls a register readout operation, and finally, the digital output utilization circuit 801 which receives information from the register identifying the digits counted and stored by the counters of FIG. 9.

Figure 9:
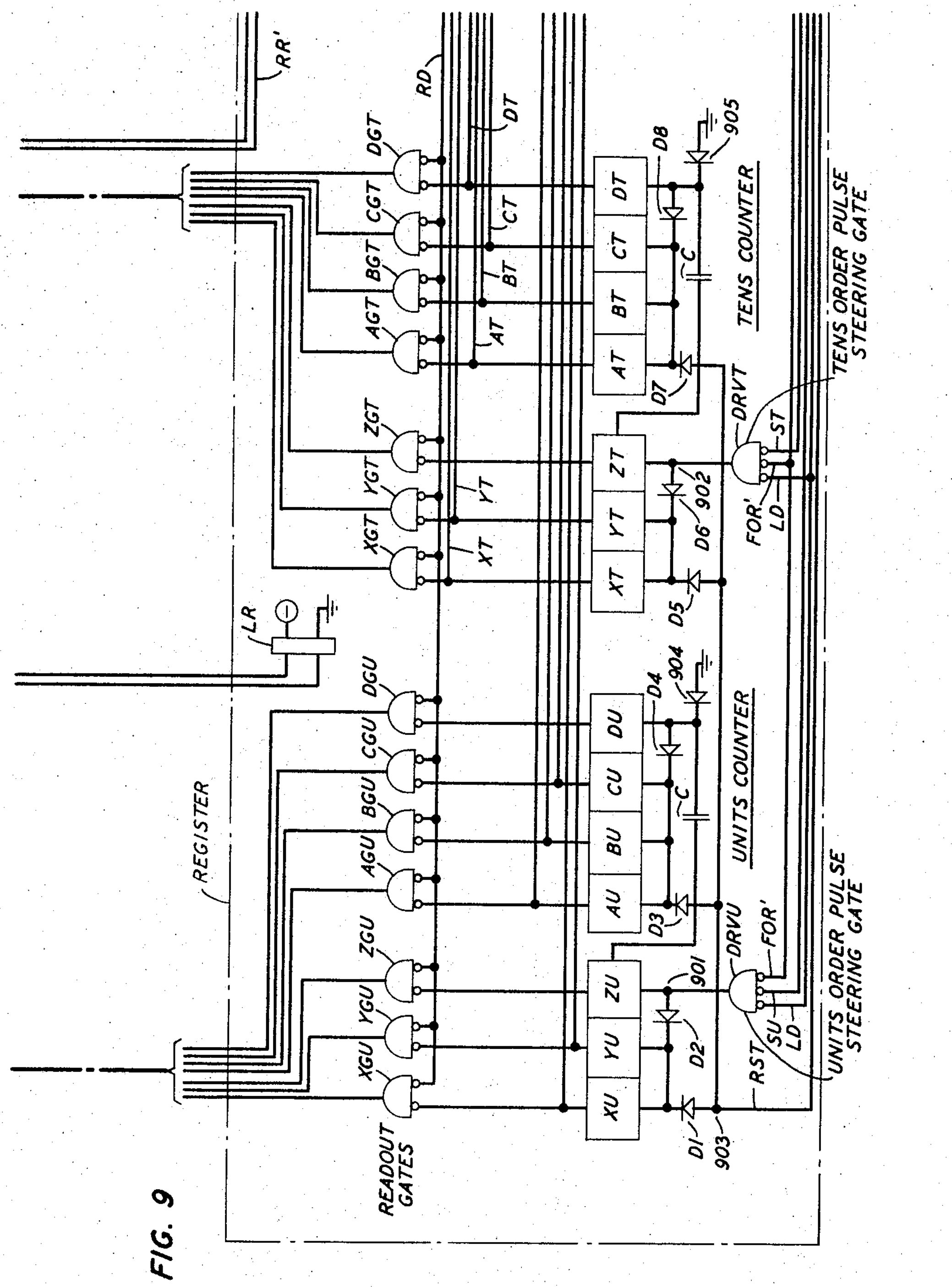

The seizure and pulse-counting operations are controlled by the LR relay shown on FIG. 9. The inner terminals of the two windings of this relay are connected to battery and ground as shown, while the outer two winding terminals are connected in a conventional loop arrangement via the normally open contacts of seizure circuit 806 to the normally closed break contacts 805 of pulse source 804. The LR relay is released during the idle condition of the circuit since the loop circuit for its control conductors is then open at contacts 806A and 806B. The relay is operated and the register is seized whenever seizure circuit 806 closes its make contacts 806A and 806B, thereby completing a path for the relay to operate in series with normally closed contacts 805. Pulses are transmitted to the register from source 804 by the repeated opening and closing of break contacts 805, thereby opening and reclosing the operate path for relay LR once for each pulse. This relay follows the pulses in the conventional manner and, by means of its contacts shown on FIG. 11, controls the operation of the register in the manner subsequently described.

Figure 11:
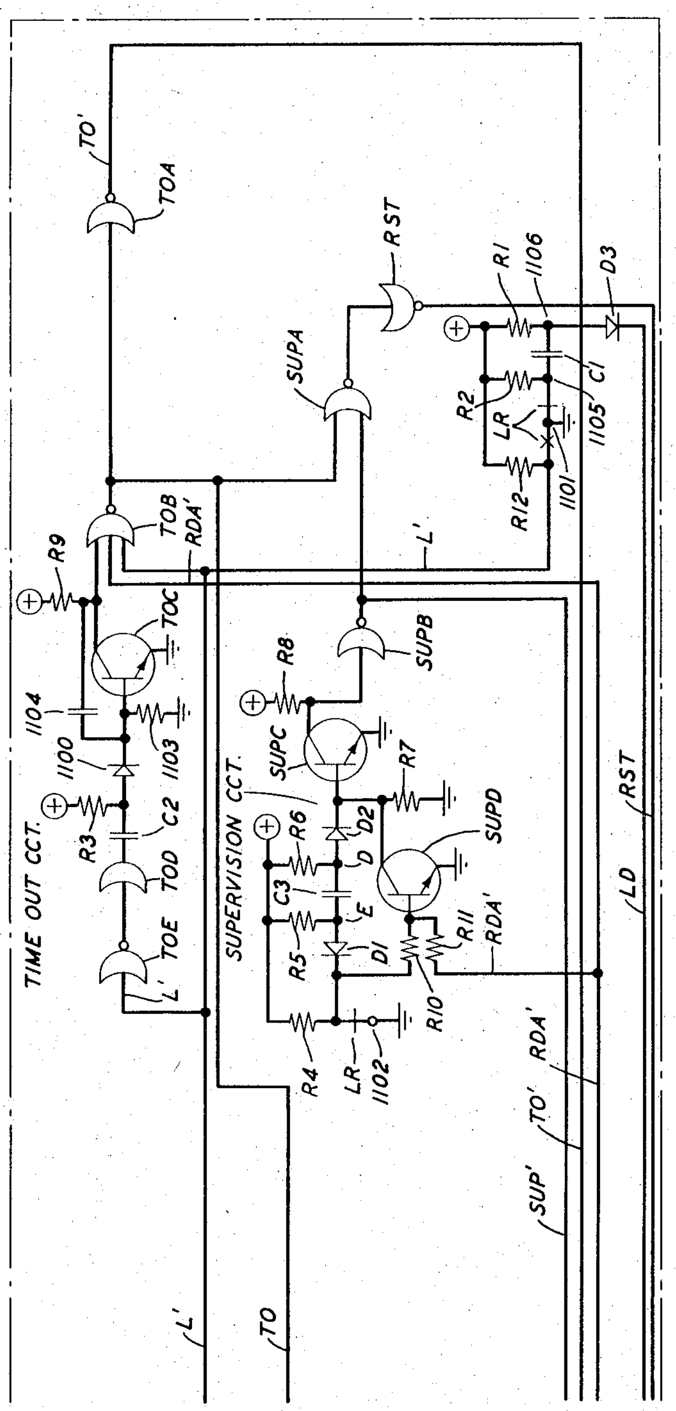

The LR relay break contacts connected to terminal 1101 on FIG. 11 follow each release and reoperation of relay LR as it receives the pulses from source 804. These break contacts, in conjunction with the pulse regenerator, effectively repeat the received pulses and apply them, via conductor LD, to the counters of FIG. 9. The LR relay is normally operated once the register is seized, and its break contacts connected to terminal 1101 are then normally open. This removes ground from terminal 1105 and allows the positive battery potential to be applied through resistor R1 and diode D3 to the LD conductor extending to the input gates of FIG. 9, thereby holding them ON and the outputs LOW. The IR drop at this time across resistor R1 charges capacitor C1 so that its right-hand plate is negative with respect to its left-hand plate.

The LR relay break contacts connected to terminal 1101 close upon each release of the relay to ground terminal 1105 during the reception of a pulse. The negative charge on the right-hand plate of capacitor C1 drives terminal 1106 negative whenever the relay is released. This negative potential does not pass through diode D3 since it is of the wrong polarity. However, it is effective to cancel the positive potential from resistor R1 which normally passes from terminal 1106 through diode D3 to conductor LD. Relay LR operates upon the termination of each pulse, opens its break contacts, and thereby allows conductor LD to return to its normal positive potential condition. It may be seen, in view of the foregoing, that the pulses received by the LR relay from the pulse source 804 are effectively repeated by the pulse regenerator on FIG. 11 and applied to conductor LD in such a manner that it is shifted from a positive potential condition to a 0 potential condition for the duration of each pulse, following which it returns to its normal positive potential state.

The LD lead pulses are applied to one input on each of the DRVT and DRVU AND gates on FIG. 9 which are, respectively, the input gates for the tens and units counters. The output of gate DRVT is connected to the input terminal 902 for the tens counter, while the output of gate DRVU is connected to the input terminal 901 for the units counter. The other two inputs to each of these gates are supplied with clamping potentials which together, in conjunction with the steering circuit of FIG. 10, enable and disable the DRVU and DRVT gates at the proper time so that the pulses for the tens and units digits are steered to the input of the appropriate counter order. The conductor FOR′ connected to one input of both gates is normally at a LOW potential prior to and during the counting operation. It is driven HIGH after the tens and units digits have counted in order to disable both gates and thereby prevent either counter from responding to any further pulses until a readout of the digits already stored therein has been effected. The SU lead connected to gate DRVU and the ST lead connected to gate DRVT, together with the steering circuit, cause the first received series of pulses to be counted by the tens counter and the second received pulse series to be counted by the units counter.

The ST lead is held LOW and the SU lead HIGH prior to and during the reception of the first pulse train. The HIGH on the SU lead at this time blocks the DRVU AND gate so that the units counter will not respond to the pulses for the tens digit. The LOW on the ST conductor at this time, together with the LOW already on the FOR′ conductor, places the ON or OFF condition of the DRVT gate solely under control of the LD lead. The LD lead is normally held at a battery potential but is momentarily driven to a 0, i.e., ground potential, during the reception of each pulse. Each 0 potential state of the LD conductor at this time turns the DRVT AND gate OFF for the pulse duration since all of its three inputs are then at a ground potential. Each turn-off of the gate drives its output potential positive, thereby transmitting a positive pulse to input terminal 902 for the tens counter. At the termination of each tens pulse, conductor LD returns to a positive potential, turns the DRVT AND gate back ON, and drives its output conductor back to a ground potential. In this manner, the DRVT gate applies a positive pulse to the tens counter for each pulse received by the register. The tens counter responds to each pulse in the manner already described in connection with the circuit of FIG. 3 and counts and stores, in combinational code form, the digit represented by the received pulse train.

Conductor ST is driven HIGH and conductor SU LOW by the steering circuit following the reception of the tens digit. This blocks the DRVT AND gate, thereby isolating the tens counter from any subsequently received pulses and simultaneously places the ON or OFF condition of the DRVU gate solely under control of the LD lead. The LD lead subsequently applies the pulses for the units digit to the DRVU gate which, in turn, causes the units counter to count and store the units digit in combinational code form in the same manner as does the tens counter.

The digit stored in each counter order is signified by the two counter sections that are OFF in accordance with the combinational code shown on FIG. 4. The output conductor for each OFF section is HIGH while the potential on the output conductor for each counter section in an ON condition is LOW. Thus, for example, a tens digit of 1 would be manifested at this time by a HIGH on the outputs of sections XT and AT and a LOW on the output of each remaining section. A units digit of 2 would be signified by a HIGH from counter sections YU and AU and a LOW from the remaining sections.

The output of each counter section is connected to one input of an associated readout AND gate on FIG. 9. The AND gates for the units counter are designated XGU through DGU while the AND gates for the tens counter are designated XGT through DGT. The other input of each readout AND gate is connected to control conductor RD which disables and enables the AND gates at the appropriate times so as to allow the digits stored in the register to be inverted and gated through to the Digital Output Utilization Circuit 801 on FIG. 8.

Figure 10:
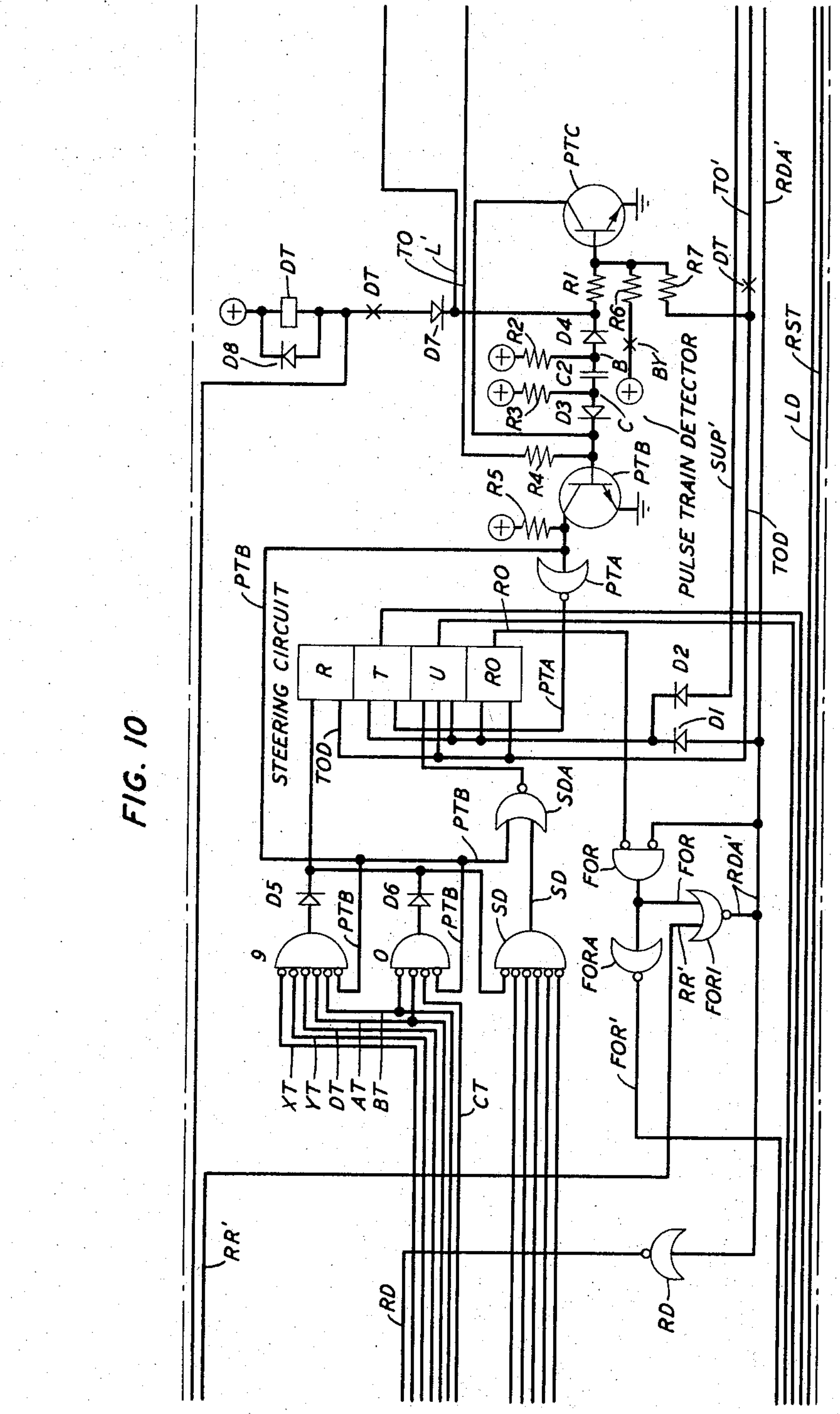

The outputs of certain counter sections are connected to the inputs of the 9, 0, and SD AND gates on FIG. 10 in order to enable the register to detect the dialing of a single digit of 9 or a single digit of 0, as well as to provide an indication that the units counter has stepped out of its reset position.

The steering circuit shown on FIG. 10 basically comprises a four-section counter having sections R, T, U, and RO which represent the reset, tens, units, and readout conditions of the register, respectively. This counter is basically similar to the counter of FIGS. 1 and 2, except that it has capacitive coupling only between its T and U sections and between its U and RO sections. There is no capacitive coupling between the R and T or between the RO and the R sections. The conductors connected to the left side of each section comprise the inputs, with each section having a plurality of inputs in the manner shown in FIG. 5. The conductors connected to the right side of the T, U, and RO sections are the output conductors.

The steering circuit is in its R state when the register is idle, and at that time the transistor of the R stage is OFF while the transistor of every other stage is ON. The output conductors SU, ST, and RO are all LOW at that time. The TOD conductor extending to the input of the R, the U, and RO stages goes HIGH, as subsequently described, when a register is first seized, and, in so doing, it advances the steering circuit one step and forces it into its T state. It is forced into its T state at this time since this is the only counter section whose input remains LOW in response to a positive-going pulse on the TOD conductor. Once the steering circuit has advanced to its tens position, the transistor of the T section is OFF while the transistor of the other section of the steering section is ON. This makes the SU output conductor HIGH and the ST and RO output conductors LOW. The SU conductor extends to one input of the DRVU gate on FIG. 9 and the HIGH on this conductor at this time holds the gate ON and blocks from the units counter the pulses received for the first digit. The ST conductor extends to the input of the DRVT AND gate on FIG. 9, and the LOW on this conductor at this time partially enables the DRVT gate so that the first series of pulses received by the register will pass through this gate to the tens counter as already described.

Once the first digit has been received, the PTA lead on FIG. 10 goes HIGH, as subsequently described, and in so doing applies a HIGH to an input of the T section of the steering circuit. This HIGH switches the transistor of the section from an OFF to an ON condition and the capacitive coupling between the T and U states turns the transistor of the U section OFF in the manner described in connection with the pulse counter of FIG. 1. In this manner, the steering circuit is advanced one step at this time so that the transistor for the U stage is now OFF while the transistor for each other stage is ON. Once this has taken place, output conductor ST is HIGH and output conductors SU and RO are LOW. The HIGH on conductor ST extends to FIG. 9 where it disables the DRVT AND gate. The LOW on conductor SU enables the DRVU AND gate and prepares it for the reception of the units digit. The pulses for the units digit are then received by the LR relay, repeated by its contacts on FIG. 11, and applied to conductor LD. The LD lead pulses do not pass through the DRVT gate since it is disabled at this time by the HIGH on the ST conductor. The DRVU gate is currently enabled due to the LOW on the SU conductor, and therefore the LD lead pulses pass through this gate to input terminal 901 of the units counter which counts the pulses in accordance with the 3×4 code of FIG. 4.

The SD gate on FIG. 10 is normally OFF (its output HIGH). It is switched from an OFF to an ON condition whenever the units counter steps out of its reset position. The lower five inputs of this gate are connected to all sections of the units counter which are ON during a reset condition of the counter. No inputs of the SD gate are connected to the Z and D sections of the units counter, both of which are OFF when the counter is reset. This being the case, the lower five inputs to the SD gate are held at ground potential whenever the counter is reset. Once the counter steps out of its reset state, one of the sections to which it is connected will have its transistor turned OFF, thereby driving its output HIGH and, in turn, turning ON the SD gate. The turn-on of the SD gate, in turn, drives its output conductor SD LOW extending to the input of the SDA gate.

The PTB input of the SDA gate is HIGH during the reception of a pulse train and is LOW at all other times. Therefore, once the units digit has been received, the PTB conductor goes LOW and, with conductor SD already LOW since gate SD is now ON, turns the SDA gate OFF and drives its output HIGH. The output of this gate is connected to one input of the U stage of the steering circuit where it causes the transistor of the stage to switch from OFF to ON. This, in turn, steps the steering circuit from its U to its RO (readout) state. This turns the RO transistor OFF and drives its RO output conductor HIGH extending to the FOR gate on the same figure. This HIGH turns the FOR gate ON, drives the FOR conductor LOW and, by means of the FORA gate, drives the FOR′ conductor HIGH. The HIGH on the FOR′ conductor disables both the DRVU and DRVT AND gates on FIG. 9 in order to isolate the counters from any further pulses that might be inadvertently received. The LOW on the FOR conductor initiates the circuit actions subsequently described to effect a readout of the digits stored in the counter.

The readout control circuit 808 supplies a battery potential through resistor 810 to conductor RR′ whenever a readout operation is not desired. A readout operation is initiated by this circuit upon the closure of its make contacts 809, at which time a ground is applied to the RR′ conductor. This conductor extends from FIG. 8 to one input of the FOR1 OR gate on FIG. 10. The FOR input to this gate is driven LOW, as already described, whenever the steering circuit is in its RO state. A LOW on the FOR input of this gate at the same time a LOW is received via the RR′ input from the readout control circuit turns the gate OFF, thereby driving its RDA′ output HIGH to the input of the RD OR gate. The HIGH on the input of the RD gate drives conductor RD LOW extending to one input of each of the readout AND gates. This, in turn, enables the gates and causes information to be transmitted to the digital output utilization circuit 801, indicating the value of the digit counted and stored in each section of the counter of FIG. 9. Make contacts 809 may be opened to terminate the readout operation. This removes the ground from conductor RR′, turns ON gate FOR1, turns OFF gate RD, which in turn drives conductor RD HIGH, to disable all of the readout AND gates of FIG. 9.

The HIGH on the RDA′ lead, upon the initiation of a readout operation, is extended through diode D1 to the input of each of the TU and RO sections of the steering circuit. This turns ON the transistors in each of these sections and thereby forces the steering circuit back into its R state.

The preceding has described the operation of the counters and the steering circuit for a conventional two-digit counting operation. The 9 and the 0 gates on FIG. 10 are provided to detect the reception of a tens digit of 9 and 0, respectively, and in turn to force the steering circuit immediately to a readout state. All inputs of the 9 AND gate, except for the PTB input, are connected to all sections of the tens counter that will be ON in the event a 9 is counted for the tens digit. Similarly, all inputs to the 0 AND gate, except for the PTB input, are connected to every section of the tens counter that will be ON whenever a 0 is counted for the tens digit. The PTB input to each of these gates is HIGH during the reception of a pulse train and goes LOW shortly after the termination of a pulse train. Thus, if a tens digit of 9 or 0 is received, all inputs to either the 9 or the 0 gate will be LOW. This will turn the 9 or 0 gate OFF and drive its output HIGH extending both to one input of the SD gate and to one input of the R section of the steering circuit. The SD gate is turned ON from this HIGH and drives its output LOW extending to the SD input of the SDA gate. The other input of the SDA gate, i.e., PTB, is already LOW, and therefore the gate turns OFF and drives its output HIGH. The output of this gate is connected to one input of the U section of the steering circuit. The LOW on conductor PTB after the reception of the pulse train, turns gate PTA OFF and extends a HIGH over the PTA lead to the T portion of the steering circuit. At this time, the R, the T, and the U portions of the steering circuit all have a HIGH on their inputs. This forces the steering circuit immediately into its RO state. The readout operation is accomplished in the same manner as already described.

It has already been mentioned that the output conductor RO of the readout portion of the steering circuit is HIGH when the steering circuit steps to its readout position. This HIGH is applied to the input of the FOR gate which, by means of the FORA gate, drives FOR′ lead HIGH extending to the DRVU and DRVT gates on FIG. 9. The HIGH on this lead holds gates DRVT and DRVU ON, thereby clamping their outputs LOW and preventing the erroneous subsequent stepping of either counter in the event that further pulses should be inadvertently received.

The function of the Pulse Detector circuit comprising the PTA, PTB, and PTC gates on FIG. 10 is to hold the PTB lead HIGH and the PTA lead LOW from the time the register is seized until the first pulse of the first digit is received, as well as for the duration of time any pulses are being received. Thus, the PTB lead is held HIGH and the PTA lead is held LOW from the time the register is seized until the termination of the pulse train for the first digit. At this time, a circuit change of state occurs and the PTB lead goes LOW while the PTA lead goes HIGH until the second pulse train is received. Once the first digit of the second pulse train is received, the PTB once again goes HIGH and the PTA LOW until all pulses of this train are received, at which time the two leads once again undergo a polarity reversal. The polarity reversals of these two leads, as already described, regulate the steering circuit so that each received pulse train is applied to the input of the appropriate counter. The polarity reversals on these two leads also enable the steering circuit to advance to a readout state, once a determination is made that no further digits are to be received.

Relay DT on FIG. 10 operated at the time the register was initially seized over the circuit including ground through make contact 806C, capacitor 814, through its own winding, to the positive battery potential. The relay initially operates over the charging current supplied through capacitor 814. Once it operates, it closes a locking path for itself through its own make contacts, dial D7, conductor L′, extending from FIG. 10 to FIG. 11 to ground through the make contacts of relay LR.

Immediately subsequent to the seizure of the register, but prior to the time the pulses of the first digit are received, a HIGH on the TO′ lead on FIG. 11, as subsequently described, is applied via the make contacts of relay DT on FIG. 10, via resistor R7, to the base of the PTC transistor to hold it ON.

The HIGH on the TO′ lead is also extended to the TOD lead to step the steering circuit out of its reset (R) and into its tens position as already described. The PTC transistor in turning ON grounds the base of the PTB transistor and turns it OFF. This holds the PTB conductor HIGH and the PTA conductor LOW. The circuit remains in this condition until the first digit is received, at which time the DT relay releases, as elsewhere described, and removes the HIGH from the PTC transistor.

Relay LR is held operated, once the register is seized, up until the time the first loop interruption occurs. The L′ conductor extending from FIG. 11 to 10 is grounded at this time and holds relay DT operated. The LR relay and, in turn, the DT relay release when the first pulse of the first digit is received as ground is removed from lead L′. The release of relay LR applies a HIGH potential to the L′ lead which, by means of resistor R1, holds the PTC transistor ON, the PTB transistor OFF, lead PTB HIGH, and lead PTA LOW. The base of the PTB transistor is effectively grounded at this time, which, in turn, effectively grounds the left plate of capacitor C2. The capacitor charges from the HIGH through resistor R2 at this time so that its right plate is positive with respective to its left plate. The L′ conductor is again grounded once the LR relay recloses upon the termination of the first pulse. This turns transistor PTC OFF. However, the capacitor C2 holds the base of transistor PTB negative for the discharge time of capacitor C2, which time is substantially longer than the interpulse time. Therefore, transistor PTB stays OFF and transistor PTA stays ON for the length of time relay LR remains operated between the reception of two subsequent pulses. Relay LR releases when the second pulse is received, it make contacts open and thereby reapply a positive potential to the L′ conductor. This turns transistor PTC ON, once again grounds the base of PTB transistor to hold it OFF, and recharges capacitor C2 in the manner already described.

The circuit operations continue in a similar manner as the LR relay closes and reoperates in response to the reception of pulses, and the charge on capacitor C2 holds the PTB transistor OFF for the duration of time a pulse train persists. Then, once the last pulse of the first digit is received and relay LR reoperates, capacitor C2 discharges and permits transistor PTB to turn ON and, in turn, drive the PTB conductor LOW and tht PTA conductor HIGH. The circuit remains in this condition until the pulses of the second digit are received, at which time transistor PTB is held OFF once again for the duration of the pulse train, following which it is once again turned ON. This change of the state of the PTB and PTA transistors controls the potentials applied to the PTA and PTB leads in such a manner that the steering circuit is advanced at the appropriate times to perform the functions already discussed.

A portion of the circuitry on FIG. 11 comprises the time-out circuit which governs the action of the register in the event that pulses are not received within a predetermined period of time after its seizure, or after the reception of the first digit. The time-out circuit on FIG. 11 measures the predetermined time interval in each instance and, upon the termination thereof, resets the counters and forces the steering circuit of FIG. 10 into its readout position.

The LR relay is released when the register is idle. At this time, the L′ lead on FIG. 11 is HIGH, which causes the output of the TOE gate to be LOW and the output of the TOD gate to be HIGH. The HIGH on the output of the TOD gate, together with the IR drop across resistor R3, holds transistor TOC ON and charges the C2 capacitor so that its left plate is positive with respect to its right plate. Once the register is seized, the LR relay operates, grounds the L′ lead, and causes the output of the TOE gate to be HIGH and the output of the TOD gate to be LOW. This effectively grounds the left plate of capacitor C2 and, in turn, causes the negative potential on its right plate to be applied to the TOC gate to hold it OFF so that its output is HIGH. The TOC gate then remains OFF for a period of time determined by the discharge time of the C2–R3 combination. The TOC gate will turn ON once the charge on C2 falls to a sufficient level. The turn-on of the TOC gate drives its output LOW and initiates the circuit actions required to reset the register counters and to drive the steering circuit to its readout position. The output of the TOC gate going LOW causes the output of the TOB gate to go HIGH and turns gate SUPA ON. This turns the RST gate OFF and drives the RST conductor HIGH. This conductor extends from FIG. 11 back to the reset circuitry of the counters on FIG. 9 and, in the manner described in connection with FIG. 3, causes the counters to be reset in the event that they are not already in that position.

The steering circuit is forced into the readout state in the following manner on a time-out. When the output of the TOB gate on FIG. 11 goes HIGH, the output of TOA goes LOW and removes the HIGH from the TO′ lead, which at this time is connected via the make contacts of relay DT and resistor R7 to the PTC gate on FIG. 10. This causes the PTC gate to turn OFF, which turns the PTB gate ON and the PTA gate OFF. This drives the PTB lead LOW and the PTA lead HIGH so that there is now a HIGH input to the T portion of the steering circuit. Once the counters are reset, the SD gate and the SDA gate together cooperate to apply a HIGH to the U portion of the steering circuit, thereby forcing it into its readout state.

There are several other inputs to the time-out circuit on FIG. 11 which deserve comment. The L′ lead is driven HIGH upon the reception of the first dial pulse and, at this time, it turns the TOE gate back ON, the TOD gate OFF, and stops the operation of the time-out circuit by recharging capacitor C2. There is also an L′ lead input to the TOB gate. This input is there to hold the output of the TOB gate LOW during the release time of the relay LR. This holds the RST lead LOW to prevent any timing problems in connection with the steering circuit or the pulse counters. This also ensures that the release of relay LR for a pulse will hold ON the TOB gate, keep its output LOW, and preclude the capacitor C2, which may be approaching a time-out condition, from turning the TOC gate ON and the TOB gate OFF. The TOB gate also has an RDA′ input which is supplied with a HIGH during the time the register is being read out. This potential inhibits the time-out circuits so that the counters will not be reset by a time-out during the readout time.

The supervision circuit is shown on FIG. 11 and comprises the SUPA, SUPB, SUPC, and SUPD gates. This circuit supervises the status of the register connection, as the name implies. The output of the supervision circuit tells the remainder of the register whether the register is still seized. This circuit functions in such a manner that the SUPC gate is held ON once the register is seized, and remains ON until a register time-out occurs after the register release. The input to the supervision circuit comprises the break contacts of the LR relay connected to terminal 1102 on FIG. 11. Prior to the time the register is seized, the LR relay is released and terminal E is grounded through diode D1 and the break contacts of the LR relay to terminal 1102. Once the register is seized, the LR relay is operated and terminal E is permitted to go positive through the resistor R5. This positive potential turns the gate SUPD ON which grounds the base of transistor SUPC to hold it OFF. This causes the output of the SUPC transistor to be held HIGH and the output of the SUPB gate to be held LOW. Capacitor C3 charges at this time in such a manner that its right plate is negative with respect to its left plate. When the LR relay releases, the E terminal is grounded and a negative potential from capacitor C3 is applied to the input of the SUPC gate, thereby holding it OFF. This maintains the output of the SUPC gate HIGH and the output of the SUPB gate LOW. When the LR relay operates again, the SUPD transistor turns back ON and by itself continues to hold the SUPC gate OFF and the SUPB gate ON.

Thus, it may be seen from the foregoing that the SUPD gate holds the SUPC gate OFF whenever the LR relay is operated, while capacitor C3 holds SUPC OFF for a predetermined time whenever the LR relay is released. The discharge time of capacitor C3 is such that it can hold SUPC OFF for the duration of time the LR relay is released during the reception of a dial pulse. However, when the register is released, relay LR releases, capacitor C3 discharges and permits the potential of terminal D to go positive. Once this occurs, transistor SUPC turns ON, thereby making its output LOW and the output of the SUPB gate HIGH. There is also an RDA′ input into the SUPD gate. RDA′ goes HIGH when the register is read out. This causes the SUPD gate to be held ON to hold the output of the SUPC gate HIGH so that if the register is released during readout, the readout will still be completed. The turn-on of the SUPC gate and the turn-off of the SUPB gate upon a release applies a HIGH to the SUP′ lead which is transmitted back to FIG. 10 and then, via diode D2, is applied to the RO, the U, and the T sections of the steering circuit to force it back into its reset condition. The HIGH on the output of the SUPB gate is applied through the SUPA and RST gates and appears as a HIGH on the RST conductor extending to the counters of FIG. 9 to return them to their reset condition in the manner already described.

It is to be understood that the above-described arrangements are but illustrative of the application of the principles of the invention. Numerous other arrangements may be devised by those skilled in the art without departing from the spirit and scope of the invention.

What is claimed is:

1. In a pulse register, a tens and a units counter, a steering circuit having a tens and a units position, means for applying all pulses received by said register to both said tens and said units counters, means operative under control of said steering circuit when in its tens position for enabling only said tens counter to count and register a first received train of pulses, means responsive to the termination of said first pulse train for advancing said steering circuit from its tens to its units position, and means operative under control of said steering circuit when in its units position for enabling only said units counter to count and register a second received train of pulses.

2. The invention recited in claim 1 in combination with a readout position in said steering circuit, means responsive to the termination of said second pulse train for advancing said steering circuit from its units to its readout position, and means operative under control of said steering circuit in its readout position for providing an output indication of the digit stored in each counter.

3. The invention recited in claim 1 in combination with a readout position in said steering circuit, means responsive to the termination of said second pulse train for advancing said steering circuit from its units to its readout position, a readout control circuit having data inputs and a clamping input, means connecting each counter to said data inputs for continuously providing said readout control circuit with an indication of the digit registered therein, an output circuit in said readout control circuit, a data utilization circuit connected to said output circuit, means connecting said clamping input to said steering circuit, said steering circuit being effective when it is not in its readout position for applying a potential to said clamping input to disable said readout control circuit, and means including said steering circuit effective when said steering circuit advances to its readout condition for applying an enabling potential to said clamping input, and means within said readout control circuit responsive to said enabling potential for transmitting over said output circuit to said utilization circuit the digital information received over said data inputs.

4. The invention recited in claim 1 in combination with a readout position in said steering circuit, means responsive to the termination of said second pulse train for advancing said steering circuit from its units to its readout position, a readout control circuit, means connecting each counter to said readout circuit for providing a continuous indication of the digit registered therein, a data utilization circuit connected to said readout circuit, and means including said steering circuit effective when it advances to its readout condition for causing said readout circuit to transmit to said utilization circuit the digital information received from said counters.

5. In a pulse register, a tens and a units counter, a steering circuit having a reset, a tens, a units, and a readout position, means for advancing said steering circuit from its reset to its tens position upon a seizure of said register, means for applying pulses simultaneously to both said tens and said units counters, means operated by said steering circuit in its tens position for enabling only said tens counter to count and register a first received train of pulses, means responsive to the termination of said first pulse train for advancing said steering circuit from its tens to its units position, means operated by said steering circuit in its units position for enabling only said units counter to count and register a second received train of pulses, means responsive to the termination of said second pulse train for advancing said steering circuit from its units to its readout position, and means operated by said steering circuit in its readout position for providing an output indication of the digits stored in each counter.

6. In a pulse register, a tens and a units counter each of which comprises a multiposition counting circuit operable in combinational code form to count and register input pulses applied thereto, each counter being effective to advance its operative position once for every input pulse received thereby, a steering circuit having a reset, a tens, a units, and a readout position, means for advancing said steering circuit from its reset to its tens position upon a seizure of said register, means for applying pulses simultaneously to both said tens and said units counters, means operated by said steering circuit in its tens position for enabling only said tens counter to count and register a first received train of pulses, means responsive to the termination of said first pulse train for advancing said steering circuit from its tens to its units position, means operated by said steering circuit in its units position for enabling only said units counter to count and register a second received train of pulses, means responsive to the termination of said second pulse train for advancing said steering circuit from its units to its readout position, and means operated by said steering circuit in its readout position for providing an output indication signifying the current operative position of each counter.

7. In a pulse register, a tens and a units counter, each of which comprises a plurality of interconnected TRL gates with two gates in each counter being OFF while the remainder are ON, each counter being effective to change the combination of OFF gates once for each input pulse received thereby, a steering circuit having a reset, a tens, a units, and a readout position, means for advancing said steering circuit from its reset to its tens position upon a seizure of said register, means for applying pulses simultaneously to both said tens and said units counters, means operated by said steering circuit in its tens position for enabling only said tens counter to count and register a first received train of pulses, means responsive to the termination of said first pulse train for advancing said steering circuit from its tens to its units position, means operated by said steering circuit in its units position for enabling only said units counter to count and register a second received train of pulses, means responsive to the termination of said second pulse train for advancing said steering circuit from its units to its readout position, and means operated by said steering circuit when in its readout position for providing an output indication signifying the TRL gates thereof currently in an OFF condition in each counter.

8. In a pulse register circuit, a tens and a units counter, a steering circuit having a reset, a tens, a units and a readout position, means for advancing said steering circuit from its reset to its tens position upon a seizure of said register, a control gate for each counter, each of said gates having a pulse input and an enable input and an output, means operative under control of said steering circuit in its tens position for applying an enable signal to the enable input of said tens counter control gate, means for applying the pulses of a first received pulse train to the pulse input of both of said control gates, means within said tens counter control gate responsive to the receipt of both said pulses and said enable signal for applying said pulses over its output to said tens counter, means within said tens counter responsive thereto for counting and registering the pulses of said first pulse train, means responsive to a termination of said pulse train for advancing said steering circuit from its tens to its units position, said steering circuit being effective in its units position for removing said enable signal from said tens gates and for applying an enable signal to the enable input of said units counter control gate, said register being effective for applying the pulses of a second pulse train to the pulse input of both of said control gates, means within said units counter control gate responsive to the receipt of both said enable signal and said second train pulses for applying said received pulses over its output to said units counter, means within said units counter responsive thereto for counting and registering the pulses of said second pulse train, means responsive to the termination of said second pulse train for advancing said steering circuit from its units to its readout position, and means operative under control of said steering circuit when in its readout position for providing an output indication of the digits stored in each counter.

9. In a pulse register circuit, a tens and a units counter, a steering circuit having a reset, a tens, a units, and a readout position, means for advancing said steering circuit from its reset to its tens position upon a seizure of said register, a control gate for each counter, each of said gates having a pulse input and an output, means operative under control of said steering circuit in its tens position for controlling said tens counter control gate to interconnect signalwise its input and output, means responsive to the reception of a first received pulse train by said register for applying said received pulses to the pulse input of both of said control gates, means within said tens counter control gate for applying said received pulses over its output to said tens counter, means in said tens counter responsive thereto for counting and registering the pulses of said first received pulse train, means responsive to a termination of said pulse train for advancing said steering circuit from its tens to its units position, means in said steering circuit effective when in its units position for disconnecting signalwise the input and output of said tens counter control gate and for controlling said units counter control gate to connect signalwise its input and output, said register being responsive to the reception of a second pulse train for applying the pulses thereof to the pulse input of both of said control gates, means within said units counter control gate for applying the pulses of said second train over its output to said units counter, means within said units counter responsive thereto for counting and registering the pulses of said second train, means responsive to the termination of said second pulse train for advancing said steering circuit from its units to its readout position, and means operative under control of said steering circuit when in its readout position for controlling said tens and units counters to provide an output indication of the digits stored therein.

10. In a plural order register, a counter for each order, each of said counters comprising a chain of bistable gates interconnected so that $n$ gates of each counter are always OFF while all remaining gates are ON, means for applying sequentially received pulse trains to said counters sequentially, order by order, to advance the OF gates therein one counter position for each received pulse, a coincidence detector, means connecting said detector to selected gates of said first order for enabling said detector to recognize the registration in said first order counter of a predetermined digit, and means including said detector responsive to a registration by said first order counter of said predetermined digit for preventing a counting operation in said subsequent orders.

11. In a plural order register, a counter for each order, each of said counters comprising a chain of bistable gates interconnected so that $n$ gates of each counter are always OFF while all remaining gates are ON, means for applying sequentially received pulse trains to said counters sequentially, order by order, to advance the OFF gates therein one counter position for each received pulse, a multi-input AND gate, means connecting each input of said AND gate to selected gates of the counter in said first order for enabling said AND gate to detect the registration in said first order counter of a predetermined digit, and means including said AND gate responsive to a registration of said predetermined digit in said first order counter for preventing a counting operation by other orders of said register.

12. In a plural order register, a counter for each order, each of said counters comprising a chain of bistable gates interconnected so that two gates of each counter are always OFF while all remaining gates are ON, means for applying sequentially received pulse trains to said counters sequentially, order by order, to advance the OFF gates therein one counter position for each received pulse, a multi-input AND gate operative to change its conductive state when all of its inputs are driven to a predetermined potential, means connecting each input of said AND gate to selected gates of the counter in said first order whereby said AND gate changes its conductive condition in response to the registration in said counter of a predetermined digit, and means including said AND gate responsive to a change in the conductive state of said AND gate for preventing a counting operation by subsequent orders of said register.

13. In a plural order register having at least a tens and a units order, a counter for each of said orders, each of said counters comprising a chain of bistable gates interconnected so that two gates of each counter are always OFF while all remaining gates are ON, a steering circuit having a reset, a tens, a units, and a readout position, means for advancing said steering circuit from its reset to its tens position upon a seizure of said register, means for applying all pulses received by said register to both said tens and said units order counters, means operative under control of said steering circuit in its tens position for enabling only said tens order counter to count and register a first received train of pulses by advancing the OFF gates therein one counter position for each received pulse, means responsive to the termination of said first pulse train for advancing said steering circuit from its tens to its units position, means operative under control of said steering circuit when in its units position for enabling only said units order counter to count and register a second received train of pulses by advancing the OFF gates therein one counter position for each received pulse, means responsive to the termination of said second pulse train for advancing said steering circuit from its units to its readout position, means operative under control of said steering circuit in its readout position for providing an output indication of the digits stored in each counter, a multi-input AND gate operative to change its conductive state when all of its inputs are driven to a predetermined potential, means connecting each input of said AND gate to selected gates of the counter in said first order whereby said AND gate changes its conductive condition in response to the registration in said counter of a predetermined digit, and means responsive to a change in the conductive state of said AND gate for immediately advancing said steering circuit to its readout position.

14. In a pulse register, a tens and a units counter, a steering circuit having a reset, a tens, a units, and a readout position, a steering control gate having an OFF and a normally ON state, means for advancing said steering circuit from its reset to its tens position upon a seizure of said register, means for turning OFF said steering circuit control gate in response to said seizure of said register, means for applying all pulses received by said register to both said tens and said units counters, means operated by said steering circuit in its tens position for enabling only said tens counter to count and register a first received train of pulses, means for holding said steering circuit control gate in an OFF state during the reception of said first pulse train, means for turning said steering circuit control gate ON upon the termination of said first pulse train, means responsive to the turn-on of said gate for advancing said steering circuit from its tens to its units position, means operated by said steering circuit in its units position for enabling only said units counter to count and register a second received pulse train, means effective upon the receipt of said second pulse train for turning said steering circuit control gate OFF for the duration of said train, means responsive to the termination of said second pulse train for turning said steering control gate ON, means responsive to the turn-on of said control gate for advancing said steering circuit from its units to its readout position, and means operative under control of said steering circuit in its readout position for providing an output indication of the digit stored in each counter.

15. A chain of TRL gates, each comprising a transistor having a collector and an emitter and a base, D-C coupling means interconnecting the base of each gate to the collector of every other gate, A-C coupling means interconnecting the base of each gate to the collector of a preceding gate, said interconnections being effective to control said gates so that the transistor of one gate is OFF while the transistor of each other gate is ON, an input terminal, and means interconnecting said input terminal with the base of each gate, said gates and said interconnections being effective upon the receipt of pulses by said input terminal for advancing the OFF condition of said gates one position in said chain for each received pulse.

16. The invention recited in claim 15 wherein the emitter of each transistor is connected to a signal ground while the collector of each transistor is connected via a resistor to the ungrounded side of a power supply whose other side is grounded.

17. The invention recited in claim 15 wherein each of said D-C coupling means comprises a resistor and each of said A-C coupling means comprises a series connected resistor and capacitor.

18. A counter comprising two separate chains of TRL gates, each gate comprising a transistor having a collector and an emitter and a base, D-C coupling means interconnecting the base of each gate to the collector of every other gate in the same chain, A-C coupling means interconnecting the base of each gate to the collector of a preceding gate in the same chain, said interconnections being effective to control said gates so that the transistor of one gate in each chain is OFF while the transistor of each other gate is ON, an input terminal for each chain, means interconnecting each input terminal with the base of each gate in its chain, said gates and said interconnections being effective upon the receipt of pulses by each input terminal for advancing the OFF condition of the gates of its chain one position for each received pulse, and means connecting the input terminal of one chain to a collector of a gate in the other chain to form a carry circuit between the two chains.

19. In a plural order register having a tens and a units order a counter, each of said counters comprising a chain of bistable gates interconnected so that N gates of each counter are always OFF while all remaining gates are ON, a steering circuit having a reset, a tens, a units, and a readout position, means for advancing said steering circuit from its reset to its tens position upon a seizure of said register, means for applying all pulses received by said register to both said tens and said units order counters, means operative under control of said steering circuit in its tens position for enabling only said tens counter to count and register a first received train of pulses by advancing the combination of OFF gates therein one counter position for each received pulse, means responsive to the termination of said first pulse train for advancing said steering circuit from its tens to its units position, means operative under control of said steering circuit in its units position for enabling only said units counter to count and register a second received train of pulses by advancing the combination of OFF gates therein one counter position for each received pulse, means responsive to the termination of said second pulse train for advancing said steering circuit from its units to its readout position, and means operative under control of said steering circuit in its readout position for providing an output indication of the digits stored in each counter by signifying the current combination of OFF gates therein.

20. In a pulse register circuit, a tens and a units counter, a steering circuit having a tens and a units position, a control gate for each counter, means responsive to the reception of a first received pulse train by said register for applying said received pulses to both of said control gates, means within said tens counter control gate operative under control of said steering circuit for applying said first pulse train to said tens counter, means in said tens counter responsive thereto for counting and registering the pulses of said first train, means responsive to a termination of said pulse train for advancing said steering circuit from its tens to its units position, said register being responsive to the reception of a second pulse train for applying the pulses thereof to both of said control gates, means within said units counter control gate for applying the pulses of said second train to said units counter, and means within said units counter responsive thereto for counting and registering the pulses of said second train.

21. The invention recited in claim 20 in combination with a readout position in said steering circuit, means responsive to the termination of said second pulse train for advancing said steering circuit from its units to its readout position, and means operative under control of said steering circuit when in its readout position for controlling said tens and units counters to provide an output indication of the digits stored therein.

References Cited

UNITED STATES PATENTS

| | | | |
|---|---|---|---|
| 2,603,715 | 7/1952 | Vaughan | 179—18 |
| 3,117,307 | 1/1964 | Davie | 328—37 X |
| 3,340,386 | 9/1967 | Hurst | 235—92 |

MAYNARD R. WILBUR, *Primary Examiner.*

G. J. MAIER, *Assistant Examiner.*